(12) United States Patent
Uyeki et al.

(10) Patent No.: US 11,315,199 B2
(45) Date of Patent: Apr. 26, 2022

(54) SYSTEM AND METHOD FOR PROVIDING OEM CONTROL TO MAXIMIZE PROFITS

(71) Applicant: Honda Motor Co., Ltd., Tokyo (JP)

(72) Inventors: Robert Uyeki, Torrance, CA (US); Ryan Douglas Roy Harty, Long Beach, CA (US); Satoru Shinzaki, Rancho Palos Verdes, CA (US); Jeremy Whaling, Carson, CA (US); Sruthi Raju Nadimpalli, Long Beach, CA (US); Harold Michael Koenig, Redondo Beach, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 83 days.

(21) Appl. No.: 16/455,081

(22) Filed: Jun. 27, 2019

(65) Prior Publication Data
US 2020/0111175 A1     Apr. 9, 2020

Related U.S. Application Data

(60) Provisional application No. 62/741,260, filed on Oct. 4, 2018.

(51) Int. Cl.
*G06Q 10/00* (2012.01)
*G06Q 50/06* (2012.01)
(Continued)

(52) U.S. Cl.
CPC ............ *G06Q 50/06* (2013.01); *B60L 53/665* (2019.02); *B60L 53/68* (2019.02); *G06Q 10/06312* (2013.01)

(58) Field of Classification Search
None
See application file for complete search history.

(56) References Cited

U.S. PATENT DOCUMENTS 8,169,186 B1 * 5/2012 Haddad ................ B60L 53/65
320/109
8,571,955 B2   10/2013 Al Faruque et al.
(Continued)

FOREIGN PATENT DOCUMENTS

| CN | 105046371 | 11/2015 |
| CN | 106846179 | 6/2017 |
| CN | 106934542 | 7/2017 |

OTHER PUBLICATIONS

Poul H. Andersen, John A. Mathews, Morten Rask (Integrating private transport into renewable energy policy: The strategy of creating intelligent recharging grids for electric vehicles, Energy Policy 37 (2009) 2481-2486). (Year: 2009).*

(Continued)

*Primary Examiner* — Hafiz A Kassim
(74) *Attorney, Agent, or Firm* — Rankin, Hill & Clark LLP

(57) ABSTRACT

A system and method for providing original equipment manufacturer (OEM) control to maximize profits that include determining at least one demand based charging schedule and processing an OEM charging policy option to schedule charging of the at least one electric vehicle at a low energy production cost timeframe. The system and method also include modifying the at least one demand based charging schedule into a policy based charging schedule based on an acceptance of the OEM charging policy option by the at least one utility provider. The system and method further include facilitating payment of an incentive fee from the at least one utility provider to the OEM.

10 Claims, 8 Drawing Sheets

(51) Int. Cl.
 *B60L 53/68* (2019.01)
 *B60L 53/66* (2019.01)
 *G06Q 10/06* (2012.01)

(56) References Cited

U.S. PATENT DOCUMENTS

| | | | | |
|---|---|---|---|---|
| 8,706,583 | B1* | 4/2014 | Forbes, Jr. | G05D 17/00 705/34 |
| 9,393,879 | B2 | 7/2016 | Tyagi et al. | |
| 9,843,187 | B2 | 12/2017 | Uyeki | |
| 9,977,450 | B2 | 5/2018 | Jetcheva et al. | |
| 2004/0117195 | A1* | 6/2004 | Bodin | G06Q 30/08 705/39 |
| 2006/0155423 | A1* | 7/2006 | Budike | G06Q 10/06 700/286 |
| 2006/0242154 | A1* | 10/2006 | Rawat | G06F 16/168 |
| 2009/0055304 | A1* | 2/2009 | Lange | G06Q 40/00 705/37 |
| 2010/0332275 | A1* | 12/2010 | Walsh | G06Q 50/06 705/7.37 |
| 2011/0082759 | A1* | 4/2011 | Swinson | G06Q 30/0278 705/26.1 |
| 2011/0099111 | A1* | 4/2011 | Levy | G06Q 20/388 705/63 |
| 2012/0109519 | A1* | 5/2012 | Uyeki | B60L 50/51 701/439 |
| 2012/0140752 | A1* | 6/2012 | Yun | B60L 53/65 370/338 |
| 2012/0253567 | A1* | 10/2012 | Levy | H02J 7/0027 701/22 |
| 2012/0272077 | A1* | 10/2012 | Dow | G06F 1/3206 713/310 |
| 2013/0018804 | A1* | 1/2013 | Swinson | G06Q 10/10 705/306 |
| 2013/0335025 | A1* | 12/2013 | Kuribayashi | B60L 53/11 320/109 |
| 2013/0339108 | A1* | 12/2013 | Ryder | B60L 53/63 705/14.1 |
| 2014/0018971 | A1* | 1/2014 | Ellis | G06Q 10/04 700/297 |
| 2014/0214459 | A1* | 7/2014 | Ryder | G06Q 30/0645 705/5 |
| 2015/0046222 | A1* | 2/2015 | Ishii | G06Q 30/0202 705/7.31 |
| 2015/0158393 | A1* | 6/2015 | Kawano | B60L 53/60 320/109 |
| 2015/0298565 | A1* | 10/2015 | Iwamura | B60L 53/60 701/22 |
| 2016/0025506 | A1* | 1/2016 | Penilla | B60L 53/665 701/430 |
| 2016/0126732 | A1* | 5/2016 | Uyeki | H02J 3/14 700/295 |
| 2016/0140449 | A1 | 5/2016 | Ansari et al. | |
| 2016/0350778 | A1* | 12/2016 | Levine | G06Q 30/0208 |
| 2017/0005515 | A1* | 1/2017 | Sanders | H02J 3/14 |
| 2017/0017213 | A1* | 1/2017 | Miftakhov | B60L 53/54 |
| 2017/0250550 | A1* | 8/2017 | Miftakhov | B60L 53/68 |
| 2018/0114283 | A1* | 4/2018 | Mokhtari | G06Q 10/06312 |
| 2018/0240141 | A1 | 8/2018 | Uyeki | |
| 2019/0147551 | A1* | 5/2019 | Sun | H02J 3/008 700/291 |
| 2019/0156438 | A1* | 5/2019 | Song | G06Q 30/0206 |

OTHER PUBLICATIONS

J. L. Sullivan I. T. Salmeen and C. P. Simon (PHEV Marketplace Penetration An Agent Based Simulation, Jul. 2009). (Year: 2009).*
David L. Comis (Electric Vehicle Charging in the 21st Century, A Capstone Project for Master of Science, May 2015). (Year: 2015).*
Julie Swann (Dynamic Pricing and the Direct-to-Customer Model in the Automotive Industry, Electronic Commerce Research, 5: 309-334 (2005)). (Year: 2005).*
Erika H. Myers, Utilities and Electric Vehicles—The Case for Managed Charging, Smart Electric Power Alliance, Apr. 2017, pp. 1-28, Washington, DC, USA.

* cited by examiner

SYSTEM AND METHOD FOR PROVIDING OEM CONTROL TO MAXIMIZE PROFITS

CROSS-REFERENCE TO RELATED APPLICATION

This application claims priority to U.S. Provisional Application Ser. No. 62/741,260 filed on Oct. 4, 2018, which is expressly incorporated herein by reference.

BACKGROUND

Currently, electric vehicles (EVs) may be directly connected to electric vehicle supply equipment (EVSE). For example, a third party electric vehicle infrastructure company (third party company) may own the EVSE and may gather information directly from the EVSE. When EVs are plugged into the EVSE, a location of the EV and state of charge (SOC) data are sent from the EV to a server of the vehicle original equipment manufacturer (OEM). The EV location and the SOC information of the EV are not known to the third party company until such data is communicated by the OEM server to a third party server of the third party company. Upon receiving the location and SOC information of the EV, the third party server may generate charging schedules associated with demand response events that may be used by the EV to enable and disable charging.

The third party company consequently controls when a demand response event comes in and consequently makes charging schedules for the EVs. In such implementations, the third party company may attempt to minimize cost for the utility providers. Such minimization of costs for the utility providers does not influence earnings/profit for the OEM that is providing location and SOC information to the third party company. Accordingly, the third party company selects the lowest cost charge interval in a real time market to minimize costs for the utility companies and influences the charging schedules of EVs without any payment to the OEM. Therefore, the current charging structure does not account for remittance to the OEM with respect to the charging schedules for the EVs.

BRIEF DESCRIPTION

According to one aspect, a computer-implemented method for providing original equipment manufacturer (OEM) control to maximize profits that includes determining at least one demand based charging schedule. The at least one demand based charging schedule is based on an aggregated demand for charging of at least one electric vehicle. The computer-implemented method also includes processing an OEM charging policy option to schedule charging of the at least one electric vehicle at a low energy production cost timeframe. The OEM charging policy option is communicated to at least one utility provider. The computer-implemented method additionally includes modifying the at least one demand based charging schedule into a policy based charging schedule based on an acceptance of the OEM charging policy option by the at least one utility provider. The policy based charging schedule includes a schedule to charge the at least one electric vehicle at the low energy production cost timeframe. The computer-implemented method further includes facilitating payment of an incentive fee from the at least one utility provider to the OEM.

According to another aspect, a system for providing original equipment manufacturer (OEM) control to maximize profits that includes a memory storing instructions when executed by a processor that cause the processor to determine at least one demand based charging schedule. The at least one demand based charging schedule is based on an aggregated demand for charging of at least one electric vehicle. The instructions also cause the processor to process an OEM charging policy option to schedule charging of the at least one electric vehicle at a low energy production cost timeframe. The OEM charging policy option is communicated to at least one utility provider. The instructions additionally cause the processor to modify the at least one demand based charging schedule into a policy based charging schedule based on an acceptance of the OEM charging policy option by the at least one utility provider. The policy based charging schedule includes a schedule to charge the at least one electric vehicle at the low energy production cost timeframe. The instructions further cause the processor to facilitate payment of an incentive fee from the at least one utility provider to the OEM.

According to a further aspect, a computer-implemented method for providing original equipment manufacturer (OEM) control to maximize profits that includes determining at least one demand based charging schedule. The at least one demand based charging schedule is based on an aggregated demand for charging of at least one electric vehicle. The computer-implemented method also includes processing an OEM charging policy option to schedule charging of the at least one electric vehicle at a low carbon footprint timeframe. The OEM charging policy option is communicated to at least one third party environmental entity. The computer-implemented method additionally includes modifying the at least one demand based charging schedule into a policy based charging schedule based on an acceptance of the OEM charging policy option by the at least one third party environmental entity. The policy based charging schedule includes a schedule to charge the at least one electric vehicle at the low carbon footprint timeframe. The computer-implemented method further includes facilitating payment of a carbon credit payment from the at least one third party environmental entity to the OEM.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
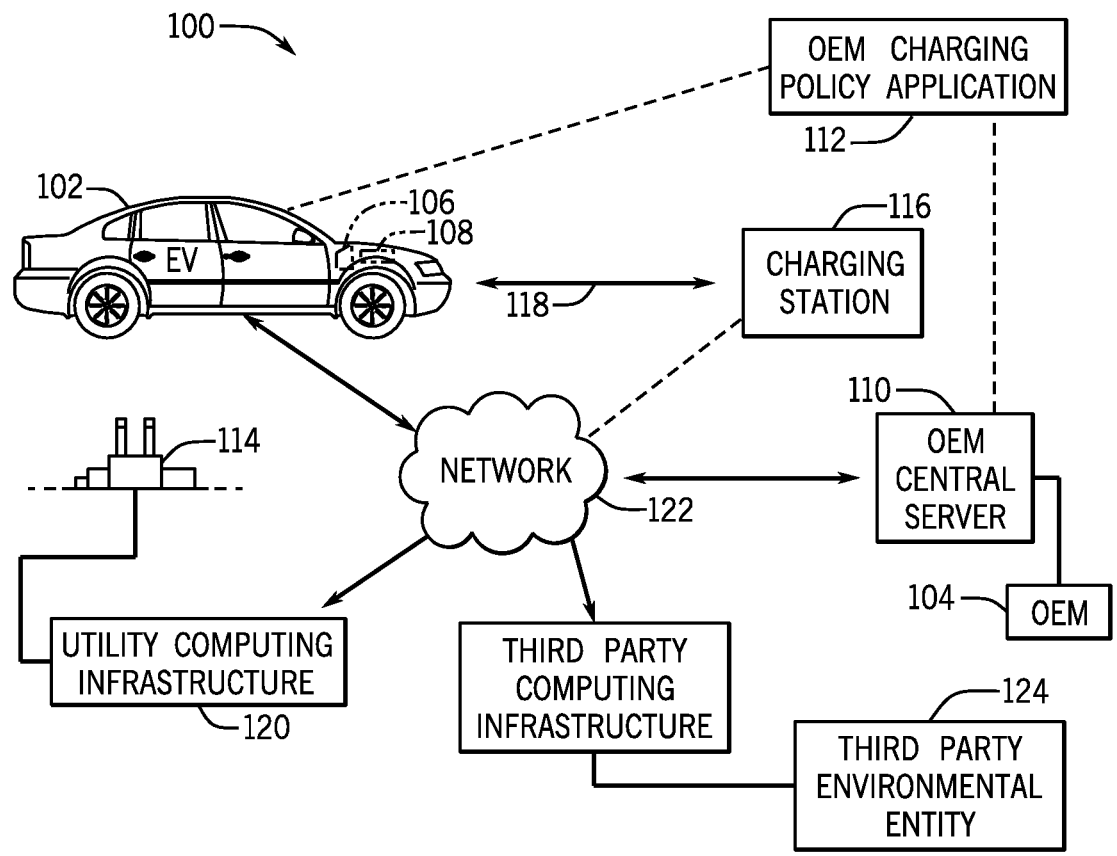
FIG. 1 is a high-level schematic view of an illustrative system for providing original equipment manufacturer (OEM) control to maximize profits based on a processed OEM charging policy option according to an exemplary embodiment.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Controller Area network (CAN), Local Interconnect Network (LIN), among others.

"Computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "computer-readable medium", as used herein, refers to a medium that provides signals, instructions and/or data. A computer-readable medium may take forms, including, but not limited to, non-volatile media and volatile media. Non-volatile media may include, for example, optical or magnetic disks, and so on. Volatile media may include, for example, semiconductor memories, dynamic memory, and so on. Common forms of a computer-readable medium include, but are not limited to, a floppy disk, a flexible disk, a hard disk, a magnetic tape, other magnetic medium, other optical medium, a RAM (random access memory), a ROM (read only memory), and other media from which a computer, a processor or other electronic device may read.

A "data store", as used herein can be, for example, a magnetic disk drive, a solid state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device. The data store can also refer to a database, for example, a table, a set of tables, a set of data stores (e.g., a disk, a memory, a table, a file, a list, a queue, a heap, a register) and methods for accessing and/or manipulating those data in those tables and data stores. The data store can reside in one logical and/or physical entity and/or may be distributed between two or more logical and/or physical entities.

A "memory", as used herein can include volatile memory and/or non-volatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory can store an operating system that controls or allocates resources of a computing device.

An "operable connection", or a connection by which entities are "operably connected", is one in which signals, physical communications, and/or logical communications can be sent and/or received. An operable connection can include a physical interface, a data interface and/or an electrical interface.

A "processor", as used herein, processes signals and performs general computing and arithmetic functions. Signals processed by the processor can include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "portable device", as used herein, is a computing device typically having a display screen with user input (e.g., touch, keyboard) and a processor for computing. Portable devices include, but are not limited to, key fobs, handheld devices, mobile devices, smart phones, laptops, tablets and e-readers.

An "electric vehicle" (EV), as used herein, refers to any moving vehicle that is capable of carrying one or more human occupants and is powered entirely or partially by one or more electric motors powered by an electric battery. The EV may include battery electric vehicles (BEVs), plug-in hybrid electric vehicles (PHEVs) and extended range electric vehicles (EREVs). The term "vehicle" includes, but is not limited to: cars, trucks, vans, minivans, SUVs, motorcycles, scooters, boats, personal watercraft, and aircraft. The term "vehicle" can also refer to an autonomous vehicle and/or self-driving vehicle. Further, the term "vehicle" can include vehicles that are automated or non-automated with pre-determined paths or free-moving vehicles.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting same, FIG. 1 is a high-level schematic view of an illustrative system 100 for providing original equipment manufacturer (OEM) control to maximize profits based on a processed OEM charging policy option according to an exemplary embodiment. The components of the system 100, as well as the components of other systems and architectures discussed herein, may be combined, omitted or organized into different architectures for various embodiments.

In the exemplary embodiment of FIG. 1, the system 100 includes one or more electric vehicles 102 (EVs) that may be manufactured, owned, and/or operated by the one or more OEMs 104. The EV(s) 102 may be powered by an electric motor 106 and an electric storage mechanism, for example, a battery 108. In one embodiment, the EV(s) 102 may be purely electric in that it only has the electric motor 106 and the battery 108. In other embodiments, the EV(s) 102 may have the electric motor 106, the battery 108, and an internal combustion engine (not shown). In some embodiments, the EV(s) 102 may have any number of electric motors, batteries, and/or internal combustion engines and they may operate in series (e.g., as in an extended range electric vehicle), in parallel, or some combination of series and parallel operation.

In one embodiment, the system 100 may additionally include an OEM central server (OEM server) 110 that may be accessed and utilized by one or more OEMs 104 (e.g., EV manufacturers). As discussed below, the OEM server 110 may include a computing device (shown in FIG. 3) that is configured to execute an OEM charging policy application 112. The OEM charging policy application 112 may be configured to communicate with one or more utility providers 114 to receive one or more energy pricing schemes. The OEM charging policy application 112 may additionally be configured to evaluate the one or more energy pricing schemes to determine a plurality of price points associated with demand response events of the EV(s) 102 that are based on state of charge (SOC) data that pertains to the state of charge of the EV(s) that are communicated to the OEM(s) 104.

As discussed below, the OEM charging policy application 112 may aggregate an OEM demand for charging based on the SOC data to determine one or more demand based charging schedules. The OEM charging policy application 112 may additionally process an OEM charging policy option. The OEM charging policy option may include an option plan (e.g., option plan/agreement) that may be accepted by the one or more utility providers 114 in order for the OEM(s) 104 to modify the one or more demand based charging schedules. In particular, if the OEM charging policy option is accepted (i.e., electronically accepted) by the utility provider(s) 114, the OEM charging policy option may be utilized by the OEM(s) 104 to modify the demand based charging schedule(s) of the EV(s) 102 into one or more respective policy based charging schedules.

As explained in more detail below, in one embodiment, the policy based charging schedule(s) may alter the charging pattern of the EV(s) 102 to charge the EV(s) 102 at one or more timeframes that include a low cost to produce energy for the utility provider(s) 114. In other words, based on the acceptance of the OEM charging policy option by the utility provider(s) 114, the demand based charging schedule may be modified such that the EV(s) 102 may be scheduled to be charged during a period(s) of time that includes a low cost to produce energy for the one or more utility providers 114.

In one embodiment, as discussed below, the OEM charging policy application 112 may additionally facilitate the payment of one or more incentive fees from the one or more utility providers 114 to the one or more OEMs 104 based on acceptance of the OEM charging policy option and the subsequent modification of the demand based charging schedule. The incentive fee may be paid as a remittance to the OEM(s) 104 to modify the charging schedule(s) in such a manner that lowers the utility provider cost to produce energy to keep up with demand response events.

Stated differently, the OEM charging policy application 112 may facilitate the compensation of OEM(s) 104 to receive incentive payments thereby influencing profits for the OEM(s) 104 that are receiving SOC information pertaining to the EV(s) 102, determining (and creating) the demand based charging schedule(s) of the EV 102, and modifying the demand based charging schedule(s) to the benefit of the utility provider(s) 114. Accordingly, the OEM charging policy application 112 facilitates the OEM(s) 104 to have control to maximize profits with respect to the scheduled charging of EV(s) 102 by facilitating the OEM(s) 104 to receive incentive payments for creating charging schedules that allow charging at lower price points with respect to a cost to produce energy for the one or more utility providers 114 to account for the charging demands of the one or more EVs 102.

Also, as discussed below, in another embodiment, the OEM charging policy option may include an option plan (e.g., option plan/agreement) that may be accepted by one or more third party environmental entities 124 in order for the OEM(s) 104 to modify the one or more demand based charging schedules. The one or more third party environmental entities 124 may include governmental/regulatory agencies, third party environmental agencies (e.g., environmental non-profit groups) that may provide monetary carbon credit payments to one or more of the OEMs 104 for ensuring that charging of the EV(s) 102 is completed during one or more timeframes at which there is a low carbon footprint (e.g., value).

In particular, if the OEM charging policy option is accepted (i.e., electronically accepted) by the one or more third party environmental entities 124, the OEM charging policy option may be utilized by the OEM(s) 104 to modify the demand based charging schedule(s) of the EV(s) 102 into one or more respective policy based charging schedules such that the EV(s) 102 may be scheduled to be charged during one or more timeframes that include a low carbon footprint based on a measure of average emissions caused by the production of energy at one or more timeframes, an overall usage of electricity at one or more timeframes, traffic patterns at one or more timeframes, and other energy usage at one or more timeframes.

In an additional embodiment, the OEM charging policy application 112 may additionally facilitate the payment of one or more carbon credit payments from the one or more third party environmental entities 124 to the one or more OEMs 104 based on acceptance of the OEM charging policy option and the subsequent modification of the demand based charging schedule. The carbon credit payment may be paid as a remittance to the OEM(s) 104 to modify the charging schedule(s) in such a manner that schedules the charging of the EV(s) 102 at one or more timeframes at which there is a low overall carbon footprint while keeping up with demand response events.

With reference to the additional components of FIG. 1, in the exemplary embodiment, the system 100 may include electric vehicle supply equipment (EVSE). The EVSE may include one or more charging stations 116 and a charging link(s) 118 that connects the charging station(s) 116 to the EV(s) 102. The EVSE may each include separate computing devices(s) (not shown) that may process and execute electronic processes. In one or more embodiments, the charging station(s) 116 may include charging equipment and may be installed at a residential home or outside a residential home, for example, at a public or private charging station. The charging station(s) 116 may replenish the battery 108 of the EV(s) 102 using a charging energy source type that indicates the type of energy the charging station provides that may be generated and/or supplied by the utility provider(s) 114.

In one or more embodiments, the charging station(s) 116 may receive energy from the utility provider(s) 114 to thereby replenish one or more electric storage mechanisms (e.g., the battery 108) of the EV 102 by charging the EV 102 through the charging link(s) 118. Additionally, in some embodiments, the charging station(s) 116 may be operably connected for computer communication with the EV(s) 102 and/or the OEM server 110, for example, to transmit and receive data (e.g., state of charge data, charge parameters, charging data and feedback, vehicle system data) to and from the EV 102 and/or the OEM server 110.

The charging link(s) 118 may be a wired or wireless link to the charging station(s) 116. Computer communication may occur also via the charging link(s) 118 and/or a wired or wireless communication link. In one embodiment, the EV(s) 102, the charging station(s) 116 and/or the charging link(s) 118 may be operably controlled to initiate or terminate charging of the EV(s) 102 from the charging station(s) 116 based on one or more charging schedules that are created by the OEM charging policy application 112. Accordingly, if the application 112 modifies the demand based charging schedule based on the acceptance of the OEM charging policy option, the EV(s) 102, the charging station(s) 116, and/or the charging link(s) 118 may be operably controlled to initiate or terminate charging according to the modified policy based demand based charging schedule.

In one embodiment, the EV(s) 102, the charging station(s) 116, and/or the charging link(s) 118 may be configured to wirelessly communicate a respective state of charge (SOC) (e.g., battery charge remaining) of the EV(s) 102 at one or more points in time. The charging station(s) 116 and/or the charging link(s) 118 may also wirelessly communicate charging information that may indicate the utilization of the charging station(s) 116 and/or the charging link(s) 118 at one or more points in time. Such data may be communicated through a network in the form of SOC data and charging data to the OEM server 110 to be analyzed by the OEM charging policy application 112.

As discussed below, the OEM charging policy application 112 may determine and aggregate a demand for charging of the EV(s) 102 at one or more timeframes that is based on the analyzation of the SOC data and charging data received by the OEM server through the network. The aggregated demand for charging may be utilized by the application 112 to determine one or more demand based charging schedules that may be implemented to charge the EV(s) 102 during one or more timeframes based on the aggregated demand for charging the EV(s) 102.

Figure 2:
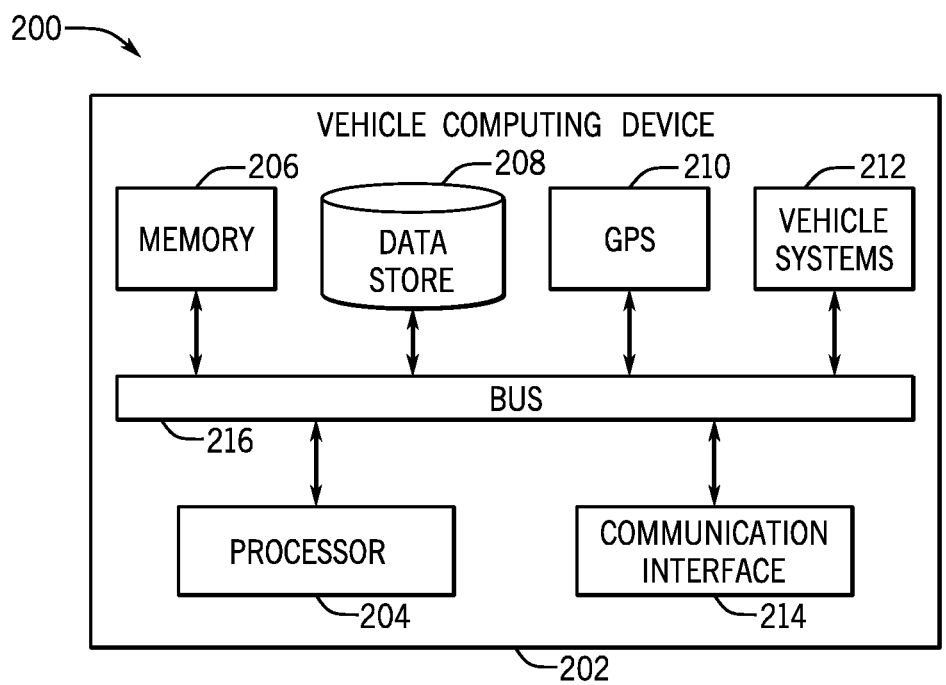
FIG. 2 is a schematic view of an illustrative electric vehicle architecture that is shown according to an exemplary embodiment.

Referring now to FIG. 2, a schematic view of an illustrative electric vehicle architecture 200, for example the EV(s) 102 of FIG. 1, is shown according to an exemplary embodiment. In particular, the EV(s) 102 may include a vehicle computing device 202 (e.g., a telematics unit, an electronic control unit) with provisions for processing, communicating and interacting with various components of the EV(s) 102 and other components of the system 100. The vehicle computing device 202 may include a processor 204, a memory 206, a data store 208, a position determination device 210 (GPS), a plurality of vehicle systems 212 (e.g., including the electric motor 106, the battery 108) and a communication interface 214. The components of the architecture 200, including the vehicle computing device 202, may be operably connected for computer communication via a bus 216 (e.g., a Controller Area Network (CAN) or a Local Interconnect Network (LIN) protocol bus) and/or other wired and wireless technologies. The vehicle computing device 202 as well as the EV(s) 102 may include other components and systems not shown.

In some embodiments, the data store 208 may store application data that may also include data pertaining to the OEM charging policy application 112. The communication interface 214 of the EV 102 may provide software, firmware and/or hardware to facilitate data input and output between the components of the vehicle computing device 202 and other components, networks and data sources. Further, the communication interface 214 may facilitate communication between the EV(s) 102 and the OEM server 110 to thereby send and receive data to and from the OEM server 110. Such data may include the SOC data sent from the EV(s) 102 to the OEM central server 110 and/or vehicle update data sent from a respective OEM(s) 104 to the EV(s) 102. In alternate embodiments, the communication interface 214 may also facilitate communication between the EV(s) 102 and a utility computing infrastructure 120 and/or a third party computing infrastructure 122 (shown in FIG. 1) to communicate data to and receive data from the respective infrastructures 120, 122.

Figure 3:
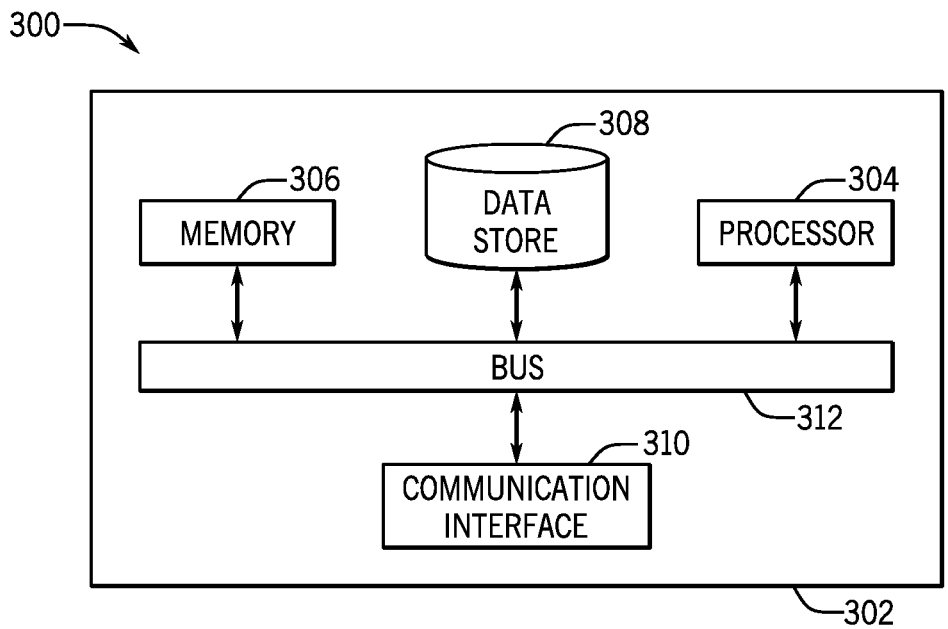
FIG. 3 is a schematic view of an illustrative OEM central server that is shown according to an exemplary embodiment.

Referring now to FIG. 3, a schematic view of an illustrative OEM central server architecture 300, for example OEM server 110 of FIG. 1, is shown according to an exemplary embodiment. The OEM server 110 may be accessed by one or more OEMs 104 to be utilized to process and store data that may include vehicle data, vehicle specifications, pricing data, and/or additional data that may be utilized to process one or more OEM charging policy options. As shown, the OEM server 110 may include a computing device 302 that may further include a processor 304, a memory 306, a data store 308, and a communication interface 310. The components of the architecture 300, including the computing device 302, may be operably connected for computer communication via a bus 312 and/or other wired and wireless technologies. The computing device 302 of the OEM server 110 may additionally include other components and systems not shown.

The data store 308 may store application data that may also include data pertaining to the OEM charging policy application 112. The communication interface 310 may be configured to provide software, firmware, and/or hardware to facilitate data input and output between the components of the computing device 302 and other components, networks and data sources. In one or more embodiments, the communication interface 310 may be used to communicate with the OEM(s) 104 to send and receive data between one or more OEMs 104, to one or more OEMs 104 from the OEM server 110, and/or from one or more OEMs 104 to the OEM server 110. The communication interface 310 may also be configured to communicate with the EV(s) 102, the charging station(s) 116, the charging link(s) 118, the utility computing infrastructure 120, the third party computing infrastructure 122, and/or other components of system 100 to determine a demand for charging, communicate the OEM charging policy option, and facilitate payment of one or more incentive fees to the OEM(s) 104.

Referring again to FIG. 1, with particular reference to the utility computing infrastructure 120, the infrastructure 120 may include one or more computing devices (not shown, similar to the computing device 302) that may communicate with one or more utility providers 114 that may include a facility for generating, transmitting and/or distributing energy to consumers, including, but not limited to, the charging station(s) 116. In one embodiment, the utility computing infrastructure 120 may receive perspective and/or real-time price data that may be provided by each respective utility provider 114 to communicate rates associated with the cost to produce energy (e.g., costs associated with the generation of power) at one or more periods of time.

The real-time price data may include costs to produce energy respectively for one or more utility providers 114 that may be communicated by the utility provider(s) 114 to the utility computing infrastructure 120. Upon the receipt of the real-time price data, the utility computing infrastructure 120 may be configured to aggregate the respective costs that may be associated with the utility provider(s) 114 to produce energy at one or more periods of time to determine one or more energy pricing schemes. The one or more energy pricing schemes may pertain to a plurality of price points associated with costs to produce energy that may be associated with respective levels of charging demands that may occur or may be predicted to occur at various timeframes.

The plurality of price points may indicate a cost for the utility providers (a price per kilowatt-hour of energy (price per kWh)) that may be charged at various timeframes with respect to a cost to produce energy for the one or more utility providers 114. The cost to produce energy may include a dynamic value that may change over time based on a time of day, a season, a region, a time zone, etc. For example, each hour of a particular day may include a different cost to produce energy based on one or more pricing schemes that are implemented by one or more natural resource providers, utility providers, and one or more levels of charging demands that may be influenced by the charging schedules implemented by the OEM(s) 104 among other factors (e.g., high expected traffic flow timeframes).

In some instances, this cost may be passed on to the owner(s)/operator(s) of the EV(s) 102 and/or the owner(s)/operator(s) of the charging station(s) 116. Stated differently, if EV(s) 102 are charged at one or more particular timeframes at which the cost to produce energy is high, the cost to the utility provider(s) 114 will be higher to support the charging schedule of one or more of the EV(s) 102. This may also account for higher costs to charge the EV(s) 102 from the perspective of additional stakeholders, such as the owner(s)/operator(s) of the EV(s) 102 and/or the owner(s)/operator(s) of the charging station(s) 116. Accordingly, the acceptance of the OEM charging policy option by the utility provider(s) 114 as processed by the OEM charging policy application 112 may alleviate such increases in cost for the utility provider(s) 114 in addition to one or more additional stakeholders.

In an exemplary embodiment, as discussed below, the OEM(s) 104 may utilize the application 112 to process the OEM charging policy option (or numerous OEM charging policy options) to provide an incentive to the utility provider(s) 114 to schedule charging of the EV(s) 102 at one or more points in time in which the cost to produce energy falls into a low percentage of a distribution of price points within a predetermined period of time. For example, the one or more points in time in which the cost to produce energy may include times in which the cost to produce energy is within a lowest 5% of a distribution of price points to produce energy during a twenty-four hour period. As discussed below, the OEM charging policy option may be processed by the application 112 based on the electronic processing completed by the components of the OEM server 110 and communication of the OEM charging policy option from the OEM server 110 to the utility computing infrastructure 120.

In an additional embodiment, the utility provider(s) 114 may communicate an incentive pricing scheme that is stored on the utility computing infrastructure 120 and may be communicated to the OEM server 110 to thereby provide an incentive to the OEM(s) 104 to modify one or more demand based charging schedules to charge the EV(s) 102 at one or more timeframes that may result in the lowering of the cost to produce energy to keep up with the charging schedule demand. Accordingly, the incentive scheme may be analyzed by the OEM charging policy application 112 to determine one or more monetary incentives that may be provided (paid) to the OEM(s) 104 based on the modification of the demand based charging schedule(s) to lower the charging demand and the price point for the utility provider(s) 114.

In an exemplary embodiment, the third party computing infrastructure 122 may include one or more computing devices (not shown, similar to the computing device 302) that may communicate to one or more third party environmental entities 124. The one or more timeframes at which a low carbon footprint may be determined based on a measure of average emissions caused by the production of energy at one or more timeframes, an overall usage of electricity at one or more timeframes, traffic patterns at one or more timeframes, and other energy usage at one or more timeframes. The carbon credit payments may provide an incentive for the utility provider(s) 114 to generate power at one or more timeframes at which the carbon footprint may be low.

In other words, the one or more third party environmental entities 124 may provide an incentive to the OEM(s) 104 in the form of the carbon credit payments to thereby compensate the OEM(s) 104 for modifying the one or more demand based charging schedules to one or more policy based charging schedules that are modified according to one or more timeframes at which there is a lower carbon footprint (that is lower than the predetermined threshold). In one embodiment, the third party environmental entities 124 may thereby communicate a credit scheme that is stored on the third party computing infrastructure 122 and further communicated to the OEM server 110 to thereby enable the application 112 to modify the demand based charging schedule to charge the EV(s) 102 at one or more timeframes where there is a lower (cleaner) carbon footprint. In particular, the credit scheme may be analyzed by the application 112 to determine one or more monetary carbon credits that may be provided (paid) to the OEM(s) 104 based on the modification of the demand based charging schedule to charge at one or more timeframes at which there is a lower carbon footprint.

II. The OEM Charging Policy Application and Related Methods

The OEM charging policy application 112 and its components will now be discussed in more detail according to an exemplary embodiment, and with continued reference to FIGS. 1-3. In one or more embodiments, the OEM charging policy application 112 may be executed by the computing device 302 of the OEM server 110. In additional embodiments, the OEM charging policy application 112 may be executed by the vehicle computing device 202 of the EV(s) 102. Data may be sent or received from the OEM charging policy application 112 to/from components of the OEM server 110, the EV(s) 102, the charging station(s) 116, the charging link(s) 118, the utility computing infrastructure 120, and/or the third party computing infrastructure 122. As discussed below, the OEM charging policy application 112 may include various modules and/or logic to facilitate the processing and implementation of the OEM charging policy option.

Figure 4:
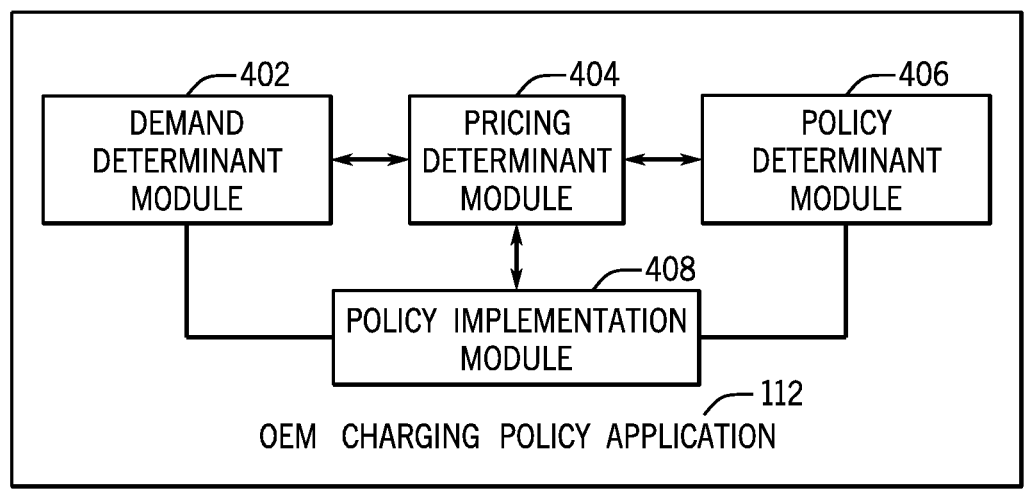
FIG. 4 is a schematic view of the OEM charging policy application that is shown according to an exemplary embodiment of the present disclosure.

Referring to FIG. 4, a schematic view of the OEM charging policy application 112 that is shown according to an exemplary embodiment of the present disclosure, the application 112 may include a demand determinant module 402, a pricing determinant module 404, a policy determinant module 406, and a policy implementation module 408. As described in more detail below, the modules 402-408 may execute computer implemented processes that may be utilized to facilitate payment of an incentive fee from the one or more utility providers 114 and/or the one or more third party environmental entities 124 to the OEM(s) 104 based on the acceptance of the processed OEM charging policy option and the subsequent modification of the demand based charging schedule(s) to the policy based charging schedule(s).

Figure 5:
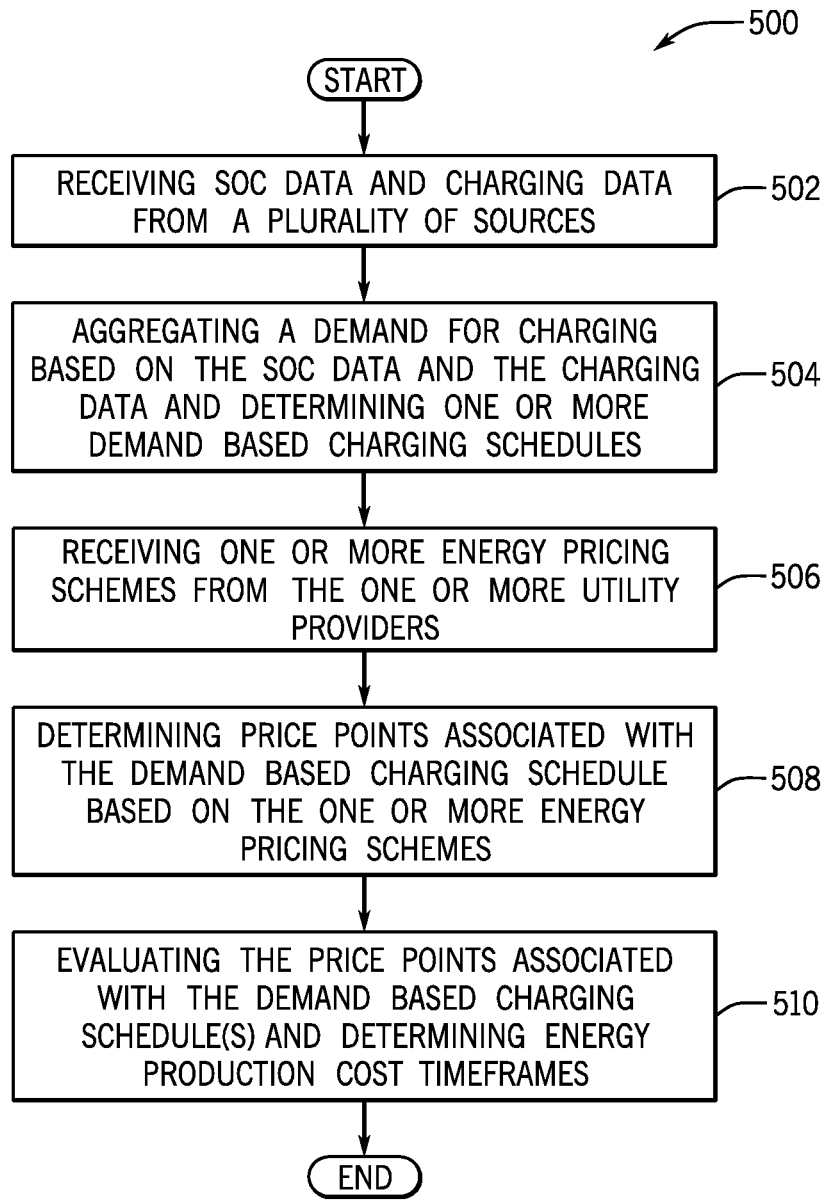
FIG. 5 is a process flow diagram of a method for determining one or more demand based charging schedules and determining price points associated with charging demands according to an exemplary embodiment.

FIG. 5 is a process flow diagram of a method 500 for determining one or more demand based charging schedules and determining price points associated with charging demands according to an exemplary embodiment. FIG. 5 will be described with reference to the components of FIGS. 1-4, though it is to be appreciated that the method 500 of FIG. 5 may be used with other system and/or components. The method 500 may begin at block 502, wherein the method 500 may include receiving SOC data and charging data from a plurality of sources.

In an exemplary embodiment, the demand determinant module 402 of the OEM charging policy application 112 may be configured to utilize the communication interface 310 of the OEM server 110 to communicate with one or more of the plurality of sources that may provide SOC data that pertains to the state of charge of the EV(s) 102 at one or more periods of time. In one configuration, the SOC data may be received by the OEM server 110 directly from the EV(s) 102 based on wireless communication between the communication interface 214 of the vehicle computing device 202 of the EV(s) 102 and the communication interface 310 of the computing device 302 of the OEM server 110. The OEM server 110 may accordingly obtain real-time SOC data associated with the EV(s) 102 at one or more points in time that may be further analyzed by the application 112 and/or accessed by the OEM(s) 104.

In one embodiment, charging data may be received by the OEM server 110 through communications by the charging station(s) 116 and/or the charging link(s) 118 based on the utilization of the charging station(s) 116 and/or the charging link(s) 118 to charge the EV(s) 102. Such charging data may indicate the utilization of the charging station(s) 116 and/or the charging link(s) 118 at one or more points in time. The OEM server 110 may accordingly obtain the charging data communicated by the charging station(s) 116 and/or the charging link(s) 118 at one or more points in time that may be further analyzed by the application 112 and/or accessed by the OEM(s) 104.

The method 500 may proceed to block 504, wherein the method 500 may include aggregating a demand for charging based on the SOC data and the charging data and determining one or more demand based charging schedules. In an exemplary embodiment, upon receiving SOC data from the EV(s) 102, the charging station(s) 116, and/or the charging link(s) 118, the demand determinant module 402 may evaluate the SOC data pertaining to each of the EV(s) 102 and the charging data based on the utilization of the charging station(s) 116 and/or the charging link(s) 118 to charge the EV(s) 102 and may aggregate a demand for charging at one or more timeframes. The aggregated demand for charging may indicate one or more timeframes at which there are one or more demand levels (e.g., low, medium, high) for charging of the battery 108 of the EV(s) 102 based on aggregated usage patterns of the EV(s) 102 as derived based on evaluation of the SOC data and the charging data.

In one embodiment, upon aggregating the demand for charging, the demand determinant module 402 may thereby determine one or more demand based charging schedules that are based on the aggregated demand for charging. The one or more demand based charging schedules may respectively include one or more time slots (e.g., quarter hour, half-hour, hourly, etc.) that may further include one or more levels of charging (e.g., 0-10) that may be provided to partially or fully charge the EV(s) 102 based on analyzing the aggregated demand for charging at one or more timeframes. The analysis of the one or more demand based charging schedules may indicate average timeframes in which the demand for charging is required to schedule charging of the EV(s) 102.

The method 500 may proceed to block 506, wherein the method 500 may include receiving one or more energy pricing schemes from the one or more utility providers 114. In an exemplary embodiment, upon aggregating the demand for charging and determining one or more demand based charging schedules, the demand determinant module 402 may communicate respective data to the pricing determinant module 404 of the OEM charging policy application 112. The OEM charging policy application 112 may thereby utilize the communication interface 310 of the OEM central server 110 to communicate data pertaining to the one or more demand based charging schedules to the utility computing infrastructure 120 to be evaluated by the one or more utility providers 114.

In one embodiment, the one or more utility providers 114 may access the demand based charging schedule(s) based on the aggregated demand for charging and may input one or more energy pricing schemes to the utility computing infrastructure 120. The one or more energy pricing schemes may include price points that are associated with a cost to produce energy for the one or more utility providers 114 to account for the charging demands of the EV(s) 102 that are based on the one or more demand based charging schedules.

In other words, the one or more energy pricing schemes may include pricing categories (e.g., price points, price ranges, price average overage percentage) that may be charged to the utility provider(s) 114 that are implemented by one or more natural resource providers, utility providers, and one or more levels of charging demands that may be influenced by the charging schedules implemented by the OEM(s) 104 among other factors (e.g., high expected traffic flow timeframes). This may also account for higher costs to charge the EV(s) 102 from the perspective of additional stakeholders, such as the owner(s)/operator(s) of the EV(s) 102 and/or the owner(s)/operator(s) of the charging station(s) 116. In an exemplary embodiment, the one or more energy pricing schemes may be communicated from the utility computing infrastructure 120 to the OEM server 110 to be received by the pricing determinant module 404.

The method 500 may proceed to block 508, wherein the method 500 may include determining price points associated with the demand based charging schedule based on the one or more energy pricing schemes. Upon the receipt of the one or more energy pricing schemes, the pricing determinant module 404 may thereby evaluate the one or more energy pricing schemes and may thereby determine a plurality of price points associated with the demand based charging schedule at one or more timeframes based on the one or more pricing schemes.

Figure 6:
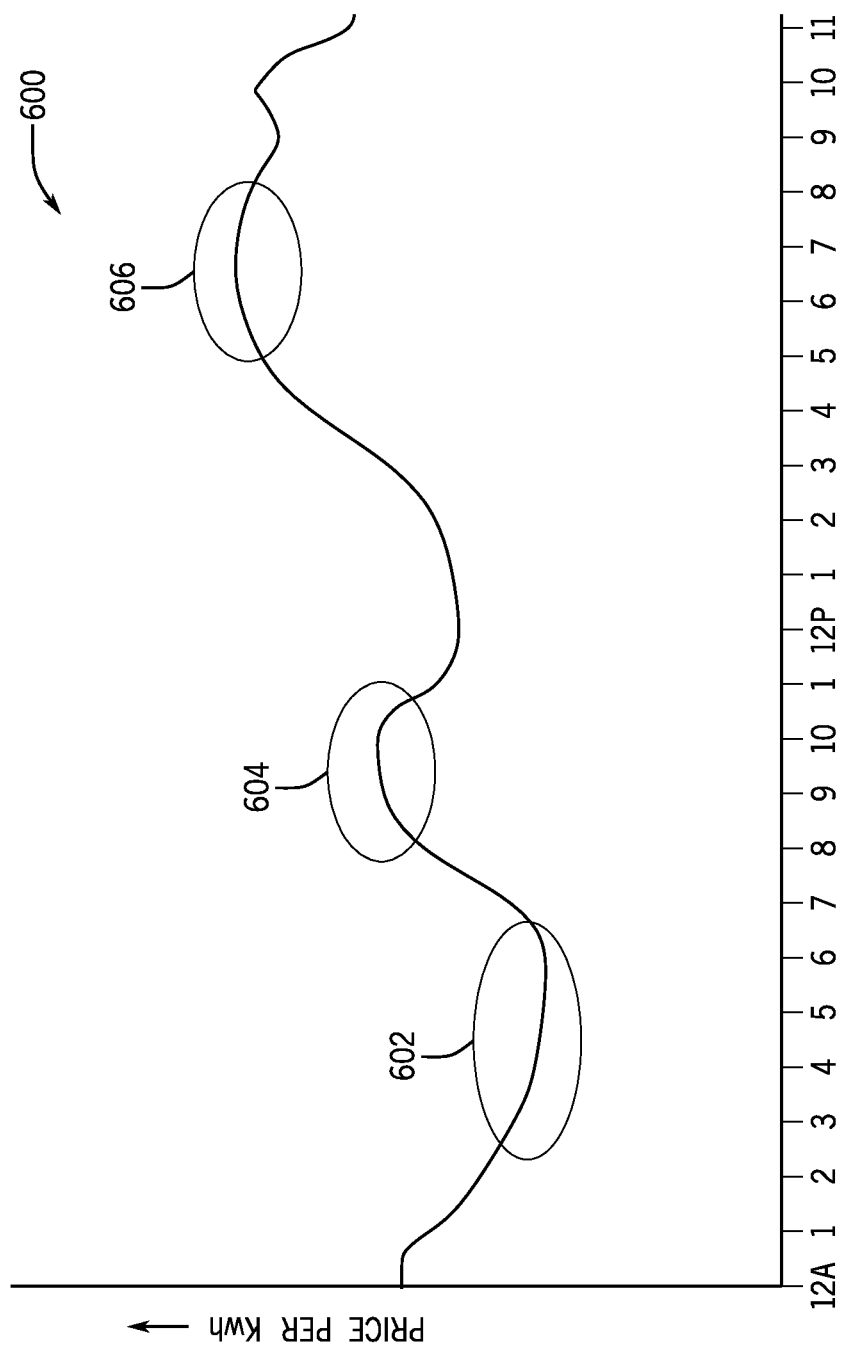
FIG. 6 is an illustrative example of a plurality of energy production cost timeframes according to an exemplary embodiment.

With reference to the illustrative example of FIG. 6, as represented by the graph 600, the pricing determinant module 404 may be configured to receive the one or more energy pricing schemes based on the communication of the scheme(s) from the utility computing infrastructure 120 to the OEM server 110. As an illustrative example, the pricing determinant module 404 may thereby determine a plurality of price points (e.g., price per kWh) that pertain to particular timeframes (shown in FIG. 6 by hours of a particular twenty-four hour period). As shown, the plurality of price points are associated with the cost to produce energy to keep up with the demand based charging schedule during the particular timeframes of a twenty-four hour period.

Referring again to FIG. 5, the method 500 may proceed to block 510, wherein the method 500 may include evaluating the price points associated with the demand based charging schedule(s) and determining energy production cost timeframes. In an exemplary embodiment, upon determining the plurality of price points, the pricing determinant module 404 may evaluate the price points and may group them into respective energy production cost timeframes that indicate particular pricing levels that are associated to the charging demands that may exist at particular timeframes.

The pricing determinant module 404 may thereby determine one or more low, moderate, and high energy production cost timeframes that represent particular price points to produce energy for the utility provider(s) 114 at one or more points in time to thereby fulfill charging demands based on the demand based charging schedule(s). The one or more low, moderate, and high energy production cost timeframes may indicate pricing levels at one or more points in time in which the cost to produce energy falls into a low percentage of a distribution of price points (e.g., lower 1-20% distribution of price points) within a predetermined period of time, a median percentage of a distribution of price points (e.g., middle 21%-69% distribution of price points) within the predetermined period of time, and a high percentage of distribution of price points (e.g., higher 70%-99% distribution of price points) within the predetermined period of time to fulfill the requirement for charging the EV(s) 102 based on the demand based charging schedule(s).

As shown in the illustrative example of FIG. 6, the pricing determinant module 404 may determine one or more low energy production cost timeframes 602, one or more moderate energy production cost timeframes 604, and one or more high energy production cost timeframes 606 that indicate pricing levels at one or more points in time (hours within the twenty-four hour period). In one embodiment, upon determining the energy production cost timeframes 602-606, the pricing determinant module 404 may communicate respective data to the policy determinant module 406 to thereby evaluate the energy production cost timeframes and process an OEM charging policy option that may be accepted to lower the demand for charging during one or more high energy production cost timeframes 606 and increase the demand for charging during one or more low energy production cost timeframes 602.

Figure 7:
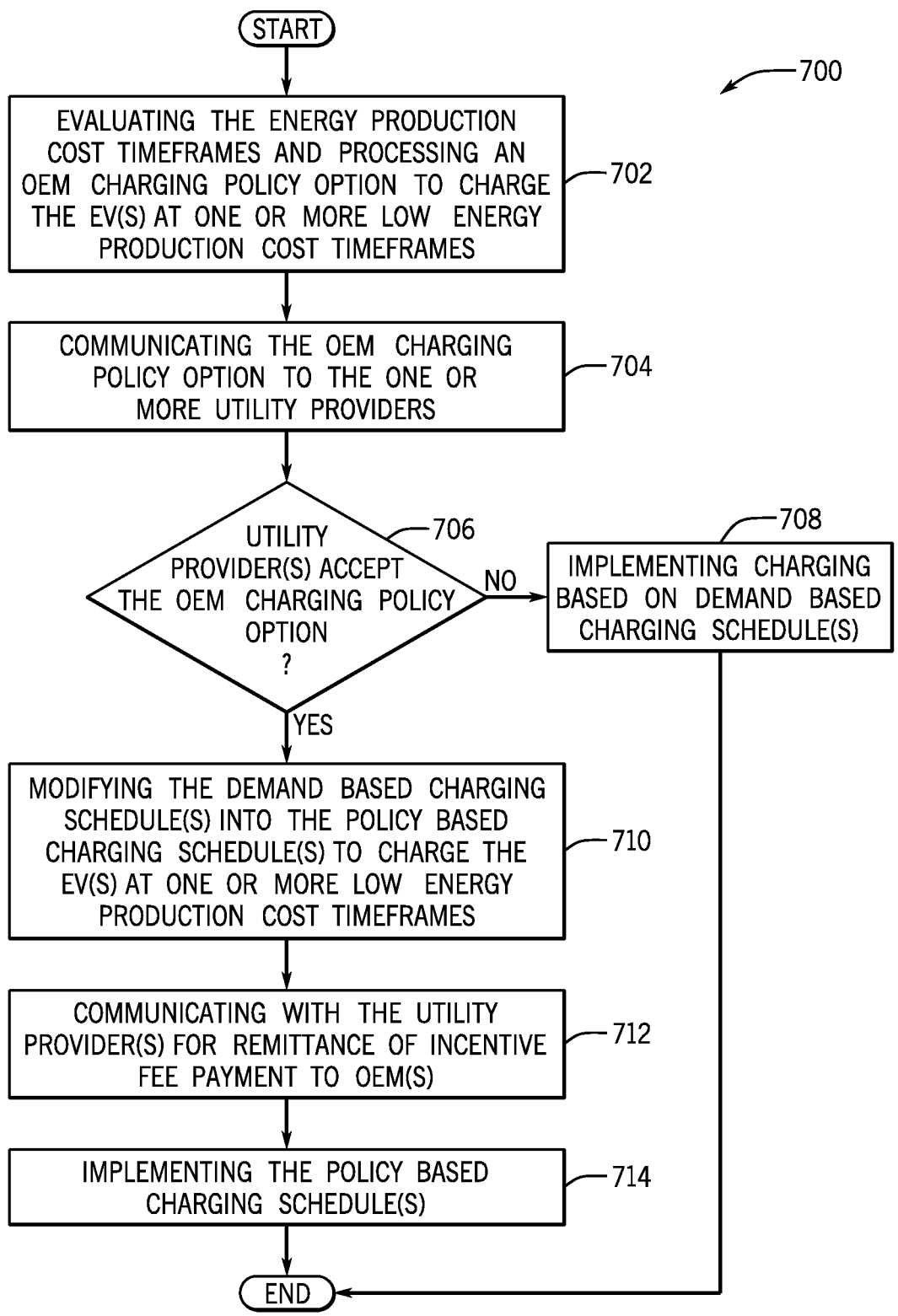
FIG. 7 is a process flow diagram of a method for processing an OEM charging policy option and implementing a policy based charging schedule to schedule charging at one or more timeframes at which there is a low cost to produce energy according to an exemplary embodiment.

FIG. 7 is a process flow diagram of a method 700 for processing an OEM charging policy option and implementing a policy based charging schedule to schedule charging at one or more timeframes at which there is a low cost to produce energy according to an exemplary embodiment. FIG. 7 will be described with reference to the components of FIGS. 1-4, though it is to be appreciated that the method 700 of FIG. 7 may be used with other system and/or components. The method 700 may begin at block 702, wherein the method 700 may include evaluating the energy production cost timeframes and processing an OEM charging policy option to charge the EV(s) 102 at one or more low energy production cost timeframes.

In an exemplary embodiment, the policy determinant module 406 of the OEM charging policy application 112 may evaluate the energy production cost timeframes to determine the OEM charging policy option that (if accepted) enables the OEM(s) 104 to modify the demand based charging schedule(s) to lower the demand for charging the EV(s) 102 during one or more high energy production cost timeframes and increase the demand for charging the EV(s) 102 during one or more low energy production cost timeframes. Such details may be included within the OEM charging policy option in addition to one or more incentive fees that may be charged to the utility provider(s) 114 to modify the demand based charging schedule(s) accordingly.

In some configurations, the one or more incentive fees may be based on an average variance (e.g., delta) of the cost to produce energy between the low energy cost timeframe(s) and the high energy cost timeframe(s). In other configurations, the one or more incentive fees may be based on an average variance (e.g., delta) of the cost to produce energy between the low energy cost timeframe(s), the moderate energy cost timeframe(s), and/or the high energy cost timeframe(s). For example, if there is a higher variance between the cost to produce energy at a low energy cost timeframe and a moderate energy cost timeframe and/or a high energy cost timeframe, the one or more incentive fees may be higher than if there is a lower variance between the cost to produce energy at the low energy cost timeframe and the moderate energy cost timeframe and/or high energy cost timeframe. It is appreciated that the one or more incentive fees may be based on a variance of one or more additional costs to produce energy at one or more additional energy cost timeframes.

In other configurations, the one or more incentive fees may be based on additional factors in addition to or in lieu of the average variance. Such factors may include seasonal factors, economic factors, regional factors, environmental factors, and the like. In additional configurations, the one or more incentive fees may also be based on inputs provided by the OEM(s) 104 to the OEM server 110 that may indicate a particular threshold (minimum, maximum) amounts of compensation that may be accepted with respect to the one or more incentive fees.

In an additional embodiment, the one or more incentive fees may be based on the incentive pricing scheme that is stored on the utility computing infrastructure 120 by the utility provider(s) 114 and that may be communicated to the OEM server 110 to thereby provide an incentive as chosen by the utility provider(s) 114 to the OEM(s) 104 to modify one or more demand based charging schedules to lower the cost to produce energy for the utility provider(s) 114.

In an exemplary embodiment, upon determining one or more incentive fees that may be charged to the utility provider(s) 114 to modify the demand based charging schedule(s), the policy determinant module 406 may process the OEM charging policy option as a data package that may be electronically processed in order to be electronically communicated to the utility provider(s) 114. The OEM charging policy option may include details pertaining to the modification of the demand for charging based on the policy based charging schedule(s) to thereby schedule charging of the EV(s) 102 during a low energy cost timeframe(s) that include a low cost to produce energy for the utility provider(s) 114 in comparison to the moderate energy cost timeframe(s) and/or the high energy cost timeframe(s).

In some embodiments, the OEM charging policy option may include details as to various levels of incentive fees that may be accepted to modify the demand based charging schedule(s) to the policy based charging schedule(s) that may allow charging of the EV(s) 102 at one or more low energy production cost timeframes and/or one or more moderate energy production cost timeframes. Accordingly, the utility provider(s) 114 may have the option to pay one or more levels of incentive fees that may allow them to lower their cost to produce energy at one or more respective levels.

As an illustrative example, with respect to FIG. 6, the OEM charging policy option may include details as to a high incentive fee that may be accepted by the OEM(s) 104 to modify the demand based charging schedule(s) to the policy based charging schedule(s) that may allow charging of the EV(s) 102 during one or more low energy production cost timeframes 602. Additionally, the OEM charging policy option may include details as to a more moderate incentive fee that may be accepted by the OEM(s) 104 to modify the demand based charging schedule(s) to the policy based charging schedule(s) that may allow charging of the EV(s) 102 during the moderate energy production cost timeframe(s). Accordingly, the utility provider(s) 114 may determine a preferred amount to spend in the form of incentive fees to the OEM(s) 104 to lower their cost to produce energy to support the charging demands of the EV(s) 102.

The method 700 may proceed to block 704, wherein the method 700 may include communicating the OEM charging policy option to the one or more utility providers 114. In one embodiment, the OEM charging policy application 112 may utilize the communication interface 310 of the OEM server 110 to communicate the OEM charging policy option to the utility computing infrastructure 120. The utility computing infrastructure 120 may be accessed by the utility provider(s) 114 to analyze the OEM charging policy option as processed by the policy determinant module 406 of the OEM charging policy application 112. Accordingly, one or more of the utility provider(s) 114 may analyze details included within the OEM charging policy option to determine the incentive fees(s) that may be accepted by the OEM(s) 104 to modify the demand based charging schedule(s) to the policy based charging schedule(s) that may allow scheduled charging of the EV(s) 102 at a lower cost to produce energy for the utility provider(s) 114.

The method 700 may proceed to block 706, wherein the method 700 may include determining if the utility provider(s) 114 accept the OEM charging policy option. In an exemplary embodiment, the utility provider(s) 114 may indicate their acceptance or rejection of the OEM charging policy option through one or more interfaces (e.g., user interfaces) that are presented through the utility computing infrastructure 120. If the utility provider(s) 114 indicate acceptance of the OEM charging policy option, the utility computing infrastructure 120 may communicate respective data to the OEM central server 110. Alternatively, if the utility provider(s) 114 indicate rejection of the OEM charging policy option, the utility computing infrastructure 120 may communicate respective data to the OEM central server 110. The policy determinant module 406 may thereby determine if the utility provider(s) 114 accept the OEM charging policy option or do not accept the OEM charging policy option and may communicate respective data to the policy implementation module 408 of the OEM charging policy application 112.

If it is determined that the utility provider(s) 114 do not accept the OEM charging policy option (at block 706), the method 700 may proceed to block 708, wherein the method 700 may include implementing charging based on the demand based charging schedule(s). In an exemplary embodiment, the policy implementation module 408 may implement charging of the EV(s) 102 based on the one or more demand based charging schedules (determined at block 504 of the method 500). In other words, the implementation of the demand based charging schedule(s) may be utilized to charge the EV(s) 102 at one or more points in time based on an aggregated demand for charging to account for demand response events associated with the one or more EVs 102 and irrespective of a cost to produce energy for the one or more utility providers 114.

If it is determined that the utility provider(s) 114 do accept the OEM charging policy option (at block 706), the method 700 may proceed to block 710, wherein the method 700 may include modifying the demand based charging schedule(s) into the policy based charging schedule(s) to charge the EV(s) 102 at one or more low energy production cost timeframes. In an exemplary embodiment, the policy implementation module 408 may thereby modify the demand based charging schedule(s) to the policy based charging schedule(s) to charge the EV(s) 102 at a lower cost to produce energy for the utility provider(s) 114.

In other words, based on the acceptance of the OEM charging policy option by the utility provider(s) 114, the demand based charging schedule(s) may be modified such that the EV(s) 102 may be scheduled to be charged during a period(s) of time that includes a low cost to produce energy for the one or more utility providers 114. For example, with respect to FIG. 6, the demand based charging schedule(s) to charge the EV(s) 102 may be modified such that the EV(s) 102 are no longer scheduled to be charged during one or more high energy production cost timeframes 606. Accordingly, the policy based charging schedule(s) may include the scheduling of EV(s) 102 to be charged during one or more low energy production cost timeframes 602, wherein the cost to produce energy for the utility provider(s) 114 falls into a low percentage of a distribution of price points within a predetermined period of time (shown as twenty-four hours in FIG. 6).

The method 700 may proceed to block 712, wherein the method 700 may include communicating with the utility provider(s) 114 for remittance of the incentive fee payment to the OEM(s) 104. In an exemplary embodiment, upon the determination that the OEM charging policy option is accepted by the utility provider(s) 114, the policy implementation module 408 may utilize the communication interface 310 to communicate with the utility computing infrastructure 120 to communicate data that pertains to financial transaction account information (e.g., deposit account number) that may be utilized by the utility provider(s) 114 to facilitate payment of the incentive fee from the utility provider(s) 114 to the OEM(s) 104 based on the acceptance of the OEM charging policy option and the modification of the demand based charging schedule(s) into the policy based charging schedule(s). Accordingly, the policy implementation module 408 may facilitate the remittance of the incentive fee payment (based on the OEM charging policy option) to the OEM(s) 104. This functionality thereby provides the OEM(s) 104 control to maximize profits based on the processed OEM charging policy option.

The method 700 may proceed to block 714, wherein the method 700 may include implementing the policy based charging schedule(s). In an exemplary embodiment, the policy implementation module 408 may utilize the communication interface 310 to communicate with the EV(s) 102, the charging station(s) 116, and/or the charging link(s) 118 to be operably controlled to implement scheduled charging of the EV(s) 102 from the charging station(s) 116 based on the policy based charging schedule(s) as modified by the OEM charging policy application 112.

Figure 8:
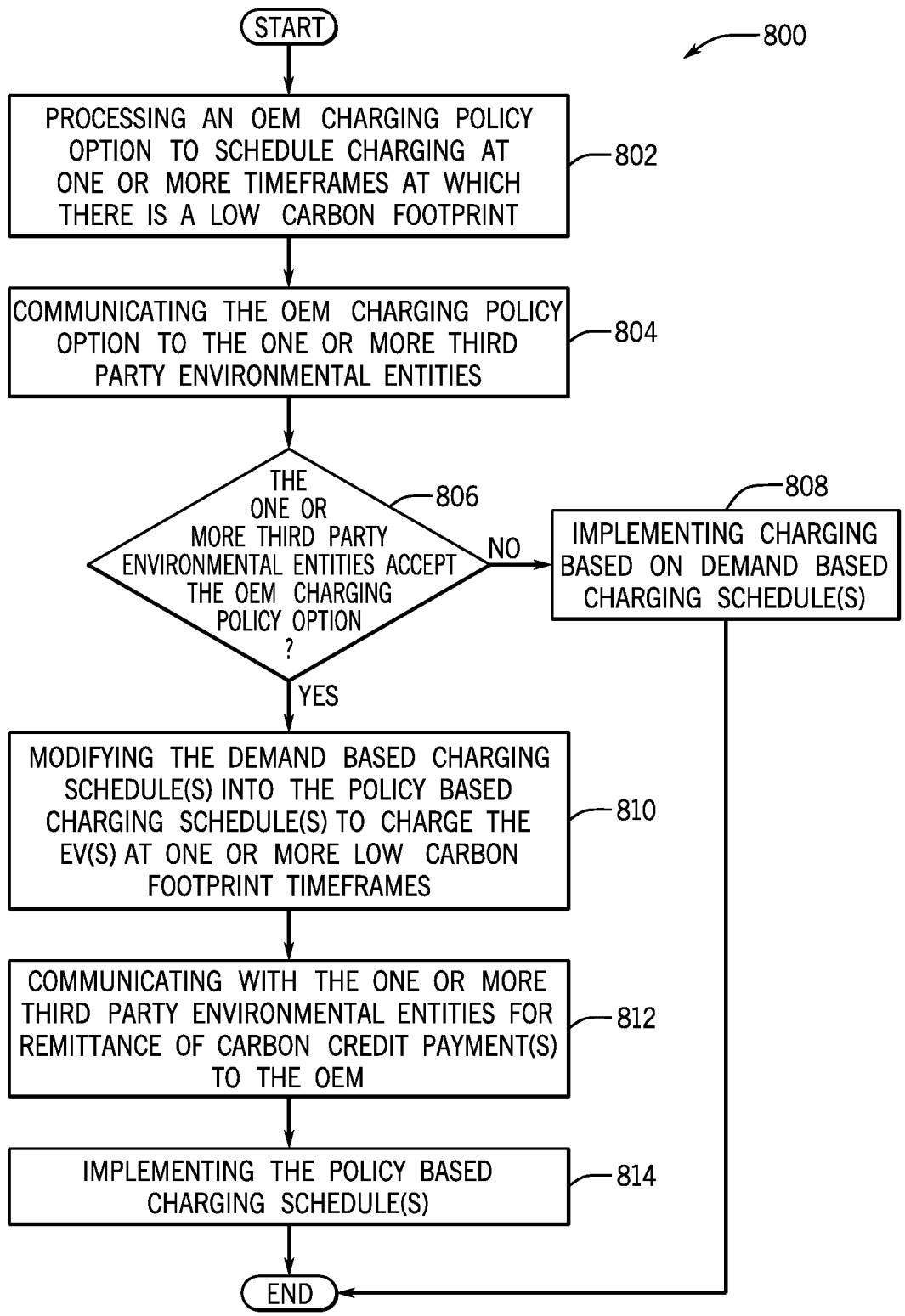
FIG. 8 is a process flow diagram of a method for processing an OEM charging policy option and implementing a policy based charging schedule to schedule charging at one or more timeframes at which there is a low carbon footprint according to an exemplary embodiment.

FIG. 8 is a process flow diagram of a method 800 for processing an OEM charging policy option and implementing a policy based charging schedule to schedule charging at one or more timeframes at which there is a low carbon footprint according to an exemplary embodiment. FIG. 8 will be described with reference to the components of FIGS. 1-4, though it is to be appreciated that the method 800 of FIG. 8 may be used with other system and/or components.

The method 800 may begin at block 802, wherein the method 800 may include processing an OEM charging policy option to schedule charging at one or more timeframes at which there is a low carbon footprint. In one or more embodiments, the policy determinant module 406 may be configured to utilize the communication interface 310 of the OEM server 110 to communicate with the third party computing infrastructure 122 to obtain carbon footprint data. The carbon footprint data may include carbon footprint values associated with a plurality of timeframes within a predetermined period of time that may be evaluated by the OEM charging policy application 112.

In one or more embodiments, the policy determinant module 406 may be configured to receive carbon footprint data based on communication of the data from the third party computing infrastructure 122 to the OEM server 110. The policy determinant module 406 may thereby determine a plurality of carbon footprint values that may be associated with a measure of average emissions caused by the production of energy, an overall usage of electricity, traffic patterns at one or more timeframes, and other energy usage during the particular timeframes of a twenty-four hour period.

Figure 9:
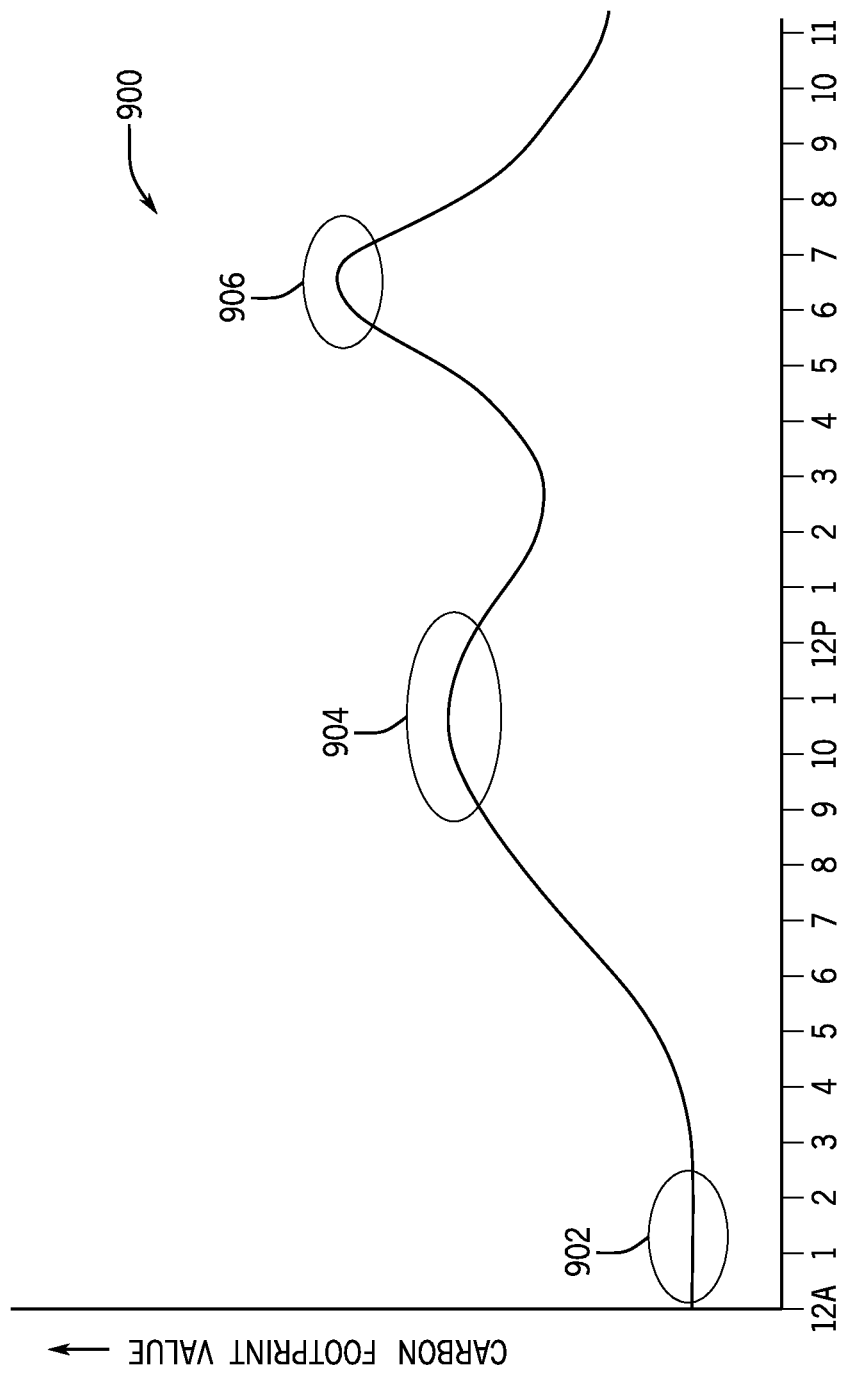
FIG. 9 is an illustrative example of a plurality of carbon footprint timeframes according to an exemplary embodiment.

In an exemplary embodiment, the policy determinant module 406 may evaluate the carbon footprint values and determine a plurality of carbon footprint timeframes within a predetermined period of time. The plurality of carbon footprint timeframes may be categorized as one or more low, moderate, and high carbon footprint timeframes that may indicate one or more timeframes that include one or more respective levels of carbon footprint values within a particular period of time. With reference to the illustrative example of FIG. 9, as represented by the graph 900, the policy determinant module 406 may determine one or more carbon footprint timeframes that indicate various levels of carbon footprint value(s) within a particular period of time such as a twenty-four hour period.

The plurality of carbon footprint timeframes may be categorized as one or more low carbon footprint timeframes 902 that include a lowest carbon footprint value(s) within the twenty-four hour period, one or more moderate carbon footprint timeframes 904 that include a moderate (median) carbon footprint value(s) within the twenty-four hour period, and one or more high carbon footprint timeframes 906 that include a high carbon footprint value(s) (e.g., dirty carbon footprint) within the twenty-four hour period.

In one or more embodiments, the policy determinant module 406 of the OEM charging policy application 112 may evaluate the energy production cost timeframes to determine the OEM charging policy option that enables the OEM(s) 104 to lower the demand for charging the EV(s) 102 during one or more high carbon footprint timeframes and increases the demand for charging the EV(s) 102 during one or more low carbon footprint timeframes. Such details may be included within the OEM charging policy option in addition to one or more carbon credit payments that may be charged to the third party environmental entities 124 for the OEM(s) 104 to modify the demand based charging schedule(s) accordingly.

In one embodiment, the policy determinant module 406 may evaluate the plurality of carbon footprint timeframes to determine one or more carbon credit payments that may be paid by the one or more third party environmental entities 124 to modify the demand based charging schedule(s) such that the EV(s) 102 may be scheduled to be charged during the low carbon footprint timeframe(s) that include the lowest carbon footprint value(s).

In some configurations, the one or more incentive fees may be based on an average variance (e.g., delta) of the carbon footprint value(s) between the low carbon footprint timeframe(s) and the high carbon footprint timeframe(s). In other configurations, the one or more incentive fees may be based on an average variance (e.g., delta) of the carbon footprint value(s) between the low carbon footprint timeframe(s), the moderate carbon footprint timeframe(s), and/or the high carbon footprint timeframe(s). For example, if there is a higher variance between the carbon footprint value(s) at a low carbon footprint timeframe and a moderate carbon footprint timeframe, and/or a high carbon footprint timeframe, the one or more incentive fees may be higher than if there is a lower variance between the carbon footprint value(s) at the low carbon footprint timeframe and the moderate carbon footprint timeframe and/or the high carbon footprint timeframe. It is appreciated that the one or more incentive fees may be based on a variance of one or more additional carbon footprint values at one or more additional carbon footprint timeframes.

In other configurations, the one or more carbon credit payments may be based on additional factors in addition to or in lieu of the average variance. Such factors may include seasonal factors, economic factors, regional factors, environmental factors, and the like. In additional configurations, the one or more carbon credit payments may also be based on inputs provided by the OEM(s) 104 to the OEM server 110 that may indicate a particular threshold (minimum, maximum) amounts of compensation that may be accepted by the OEM(s) 104 with respect to the one or more carbon credit payments.

In an additional embodiment, the one or more carbon credit payments may be based on the credit scheme that is stored on the third party computing infrastructure 122 by the third party environmental entities 124 and that may be communicated to the OEM server 110 to thereby provide an incentive to thereby enable the application 112 to modify the demand based charging schedule to charge the EV(s) 102 at one or more timeframes where there is a lower (cleaner) carbon footprint.

In an exemplary embodiment, upon determining one or more carbon credit payments that may be paid by the third party environmental entities 124 to modify the demand based charging schedule(s), the policy determinant module 406 may process the OEM charging policy option as a data package that may be electronically processed in order to be electronically communicated to the one or more third party environmental entities 124 through the third party computing infrastructure 122. The OEM charging policy option may include details as to the carbon credit payment(s) (e.g., monetary value) that may be accepted by the OEM(s) 104 to modify the demand based charging schedule(s) to a policy based charging schedule(s) to thereby schedule charging of the EV(s) 102 during a low carbon footprint timeframe(s).

In some embodiments, the OEM charging policy option may include details as to various levels of carbon credit payment(s) that may be accepted to modify the demand based charging schedule(s) to the policy based charging schedule(s) that may allow charging of the EV(s) 102 at one or more low carbon footprint timeframes and one or more moderate carbon footprint timeframes. Accordingly, the third party environmental entities 124 may have the option to pay one or more levels of incentive fees that may allow them to lower their cost to produce energy at one or more respective levels.

As an illustrative example, referring again to FIG. 9, the OEM charging policy option may include details as to the carbon credit payment(s) that may be accepted by the OEM(s) 104 to modify the demand based charging schedule(s) to a policy based charging schedule(s) to thereby schedule charging of the EV(s) 102 during the low carbon footprint timeframe 902. Additionally, the OEM charging policy option may include details as to a more moderate carbon credit payment(s) that may be accepted by the OEM(s) 104 to modify the demand based charging schedule(s) to the policy based charging schedule(s) that may allow charging of the EV(s) 102 during the moderate carbon footprint timeframe 904. Accordingly, the one or more third party environmental entities 124 may determine a preferred amount to spend in the form of one or more carbon credit payments to the OEM(s) 104 so that charging is not scheduled to occur during one or more high carbon footprint timeframes 906 that includes a dirty carbon footprint.

Referring again to FIG. 8, the method 800 may proceed to block 804, wherein the method 800 may include communicating the OEM charging policy option to one or more third party environmental entities 124. In one embodiment, the OEM charging policy application 112 may utilize the communication interface 310 of the OEM server 110 to communicate the OEM charging policy option to the third party computing infrastructure 122. The third party computing infrastructure 122 may be accessed by the one or more third party environmental entities 124 to analyze the OEM charging policy option as processed by the policy determinant module 406 of the OEM charging policy application 112.

Accordingly, one or more of the third party environmental entities 124 may analyze details included within the OEM charging policy option to determine the carbon credit payment(s) that may be accepted by the OEM(s) 104 to modify the demand based charging schedule(s) to the policy based charging schedule(s) that may allow to schedule charging of the EV(s) 102 at one or more low carbon footprint timeframes at which there are a lower amount of average emissions caused by the production of energy, an overall usage of electricity, traffic patterns at one or more timeframes, and other energy usage.

The method 800 may proceed to block 806, wherein the method 800 may include determining if the one or more third party environmental entities 124 accept the OEM charging policy option. In an exemplary embodiment, the one or more third party environmental entities 124 may indicate their acceptance or rejection of the OEM charging policy option through one or more interfaces (e.g., user interfaces) that are presented through the third party computing infrastructure 122. If the one or more third party environmental entities 124 indicate acceptance of the OEM charging policy option, the third party computing infrastructure 122 may communicate respective data to the OEM central server 110. Alternatively, if the one or more third party environmental entities 124 indicate rejection of the OEM charging policy option, the third party computing infrastructure 122 may communicate respective data to the OEM central server 110. The policy determinant module 406 may thereby determine if the one or more third party environmental entities 124 accept the OEM charging policy option or do not accept the OEM charging policy option and may communicate respective data to the policy implementation module 408 of the OEM charging policy application 112.

If it is determined that the one or more third party environmental entities 124 do not accept the OEM charging policy option (at block 806), the method 800 may proceed to block 808, wherein the method 800 may include implementing charging based on the demand based charging schedule(s). In an exemplary embodiment, the policy implementation module 408 may implement charging of the EV(s) 102 based on the one or more demand based charging schedules (determined at block 504 of the method 500). In other words, the implementation of the demand based charging schedule(s) may be utilized to charge the EV(s) at one or more points in time based on an aggregated demand for charging to account for demand response events associated with the one or more EVs 102 and irrespective of one or more timeframes at which the carbon footprint may be lower.

If it determined that the one or more third party environmental entities 124 do accept the OEM charging policy option (at block 806), the method 800 may proceed to block 810, wherein the method 800 may include modifying the demand based charging schedule(s) into the policy based charging schedule(s) to charge the EV(s) 102 at one or more low carbon footprint timeframes. In an exemplary embodiment, the policy implementation module 408 may thereby modify the demand based charging schedule(s) to the policy based charging schedule(s) to charge the EV(s) 102 at one or more low carbon footprint timeframes.

In other words, based on the acceptance of the OEM charging policy option by the third party environmental entities 124, the demand based charging schedule(s) may be modified such that the EV(s) 102 may be schedule to be charged during a period(s) of time that include a low carbon footprint. For example, with respect to FIG. 9, the demand based charging schedule(s) to charge the EV(s) 102 may be modified such that the EV(s) 102 are no longer scheduled to be charged during one or more high carbon footprint timeframes 906. Accordingly, the modified policy based charging schedule(s) may include the scheduling of EV(s) 102 to be charged during one or more low carbon footprint timeframes 902.

The method 800 may proceed to block 812, wherein the method 800 may include communicating with the one or more third party environmental entities 124 for remittance of the carbon credit payment(s) to the OEM(s) 104. In an exemplary embodiment, upon the determination that the OEM charging policy option is accepted by the one or more third party environmental entities 124, the policy implementation module 408 may utilize the communication interface 310 to communicate with the third party computing infrastructure 122 to communicate data that pertains to financial transaction account information (e.g., deposit account number) that may be utilized by the one or more third party environmental entities 124 to facilitate payment of the carbon credit payment(s) from the one or more third party environmental entities 124 to the OEM(s) 104 based on the acceptance of the OEM charging policy option and the modification of the demand based charging schedule(s) into the policy based charging schedule(s). Accordingly, the policy implementation module 408 may facilitate the remittance of the carbon credit payment(s) (based on the OEM charging policy option) to the OEM(s) 104. This functionality thereby provides the OEM(s) 104 control to maximize profits based on the processed OEM charging policy option.

The method 800 may proceed to block 814, wherein the method 800 may include implementing the policy based charging schedule(s). In an exemplary embodiment, the policy implementation module 408 may utilize the communication interface 310 to communicate with the EV(s) 102, the charging station(s) 116, and/or the charging link(s) 118 to be operably controlled to implement scheduled charging of the EV(s) 102 from the charging station(s) 116 based on the policy based charging schedule(s) as modified by the OEM charging policy application 112.

In one or more embodiments, the OEM charging policy application 112 may be configured to process an OEM charging policy option that may enable the scheduled charging of the EV(s) 102 at both a low energy production cost timeframe and at one or more timeframes at which there is a low carbon footprint (based on execution of one or more of the process steps of the methods 500, 700 and/or 800). The acceptance of the policy option by the one or more utility providers 114 and the one or more third party environmental entities 124 may be utilized to modify the demand based charging schedule into a policy based charging schedule to schedule charging of the EV(s) 102 during a lower energy production cost timeframe(s) and during a low carbon footprint timeframe(s) to allow the EV(s) 102 to be charged at a lower energy production cost to the utility provider(s) 114 and during one or more timeframes that include a low carbon footprint. Accordingly, the application 112 may facilitate payment of one or more incentive fees and one or more carbon credit payments to the OEM(s) 104 to provide the OEM(s) 104 control to maximize profits based on the modification of the demand based charging schedule at the benefit of the utility provider(s) 114 and the third party environmental entities 124, among others.

Figure 10:
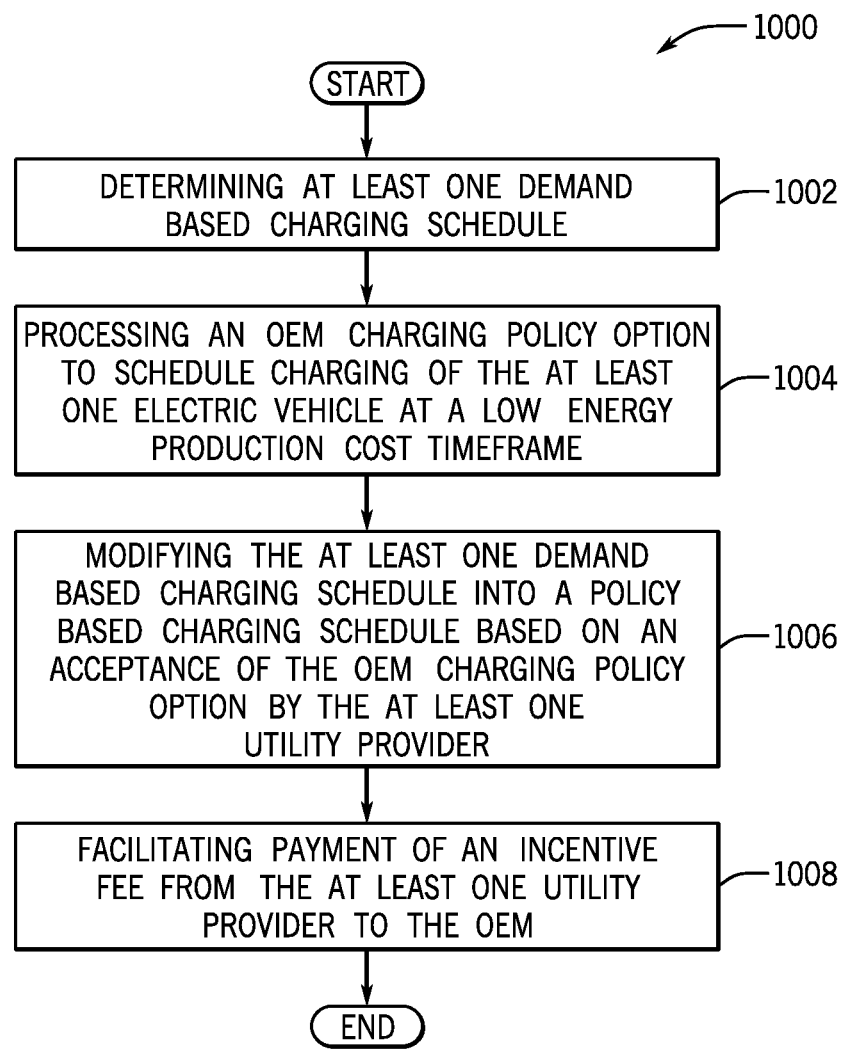
FIG. 10 is a process flow diagram of a method for providing OEM control to maximize profits according to an exemplary embodiment.

FIG. 10 is a process flow diagram of a method 1000 for providing OEM control to maximize profits according to an exemplary embodiment. FIG. 10 will be described with reference to the components of FIGS. 1-4, though it is to be appreciated that the method 1000 of FIG. 10 may be used with other system and/or components. The method 1000 may begin at block 1002, wherein the method 1000 may include determining at least one demand based charging schedule. In one embodiment, the at least one demand based charging schedule is based on an aggregated demand for charging of at least one EV 102.

The method 1000 may proceed to block 1004, wherein the method 1000 may include processing an OEM charging policy option to schedule charging of the at least one EV 102 at a low energy production cost timeframe. In one embodiment, the OEM charging policy option is communicated to at least one utility provider 114. The method 1000 may proceed to block 1006, wherein the method 1000 may include modifying the at least one demand based charging schedule into a policy based charging schedule based on an acceptance of the OEM charging policy option by the at least one utility provider 114.

In one embodiment, the policy based charging schedule includes a schedule to charge the at least one electric vehicle at a low energy production cost timeframe. The method 1000 may proceed to block 1008, wherein the method 1000 may include facilitating payment of an incentive fee from the at least one utility provider 114 to the OEM 104.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for providing original equipment manufacturer (OEM) control to maximize profits, comprising:
   determining at least one demand based charging schedule, wherein the at least one demand based charging schedule is based on an aggregated demand for charging of at least one electric vehicle, wherein the aggregated demand for charging is based on an aggregation of state of charge electronic data that is electronically received from at least one electric vehicle and charging data that is electronically received from at least one charging station, wherein at least one energy pricing scheme is electronically received from at least one utility provider and price points associated with the demand based charging schedule are determined, wherein the price points are evaluated to determine energy production cost timeframes that are associated with a cost to produce energy for the at least one utility provider;

processing an OEM charging policy option to schedule charging of the at least one electric vehicle at a low energy production cost timeframe, wherein the OEM charging policy option is communicated as electronic data to the at least one utility provider;

modifying the at least one demand based charging schedule into a policy based charging schedule based on an acceptance of the OEM charging policy option by the at least one utility provider, wherein the policy based charging schedule includes a schedule to charge the at least one electric vehicle at the low energy production cost timeframe; and facilitating payment of an incentive fee from the at least one utility provider to the OEM and causing a processor to electronically control at least one of: the at least one electric vehicle, the at least one charging station, and at least one charging link to be electronically controlled to initiate or terminate scheduled charging of the at least one electric vehicle based on the policy based charging schedule.

2. The computer-implemented method of claim 1, wherein determining the at least one demand based charging schedule includes receiving state of charge data and charging data, wherein the state of charge data indicates a state of charge of the at least one electric vehicle at one or more points in time and the charging data indicates a utilization of at least one charging station at one or more points in time.

3. The computer-implemented method of claim 2, wherein determining the at least one demand based charging schedule includes analyzing the state of charge data and the charging data and aggregating the demand for charging of the at least one electric vehicle at one or more timeframes, wherein the at least one demand based charging schedule is based on the aggregated demand for charging the at least one electric vehicle.

4. The computer-implemented method of claim 1, wherein processing the OEM charging policy option includes evaluating the energy production cost timeframes and processing the OEM charging policy option that enables the OEM to lower the demand for charging during a high energy production cost timeframe and increase the demand for charging during the low energy production cost timeframe.

5. The computer-implemented method of claim 4, wherein processing the OEM charging policy option includes detailing the incentive fee that is to be remitted by the at least one utility provider to the OEM, wherein the incentive fee is based on an average variance of the cost to produce energy between the low energy production cost timeframe and the high energy production cost timeframe.

6. A system for providing original equipment manufacturer (OEM) control to maximize profits, comprising:
a memory storing instructions when executed by a processor cause the processor to:
determine at least one demand based charging schedule, wherein the at least one demand based charging schedule is based on an aggregated demand for charging of at least one electric vehicle, wherein the aggregated demand for charging is based on an aggregation of state of charge electronic data that is electronically received from at least one electric vehicle and charging data that is electronically received from at least one charging station, wherein at least one energy pricing scheme is electronically received from at least one utility provider and price points associated with the demand based charging schedule are determined, wherein the price points are evaluated to determine energy production cost timeframes that are associated with a cost to produce energy for the at least one utility provider;

process an OEM charging policy option to schedule charging of the at least one electric vehicle at a low energy production cost timeframe, wherein the OEM charging policy option is communicated as electronic data to at least one utility provider;

modify the at least one demand based charging schedule into a policy based charging schedule based on an acceptance of the OEM charging policy option by the at least one utility provider, wherein the policy based charging schedule includes a schedule to charge the at least one electric vehicle at the low energy production cost timeframe; and facilitate payment of an incentive fee from the at least one utility provider to the OEM and cause the processor to electronically control at least one of: the at least one electric vehicle, the at least one charging station, and at least one charging link to be electronically controlled to initiate or terminate scheduled charging of the at least one electric vehicle based on the policy based charging schedule.

7. The system of claim 6, wherein determining the at least one demand based charging schedule includes receiving state of charge data and charging data, wherein the state of charge data indicates a state of charge of the at least one electric vehicle at one or more points in time and the charging data indicates a utilization of at least one charging station at one or more points in time.

8. The system of claim 7, wherein determining the at least one demand based charging schedule includes analyzing the state of charge data and the charging data and aggregating the demand for charging of the at least one electric vehicle at one or more timeframes, wherein the at least one demand based charging schedule is based on the aggregated demand for charging the at least one electric vehicle.

9. The system of claim 6, wherein processing the OEM charging policy option includes evaluating the energy production cost timeframes and processing the OEM charging policy option that enables the OEM to lower the demand for charging during a high energy production cost timeframe and increase the demand for charging during the low energy production cost timeframe.

10. The system of claim 9, wherein processing the OEM charging policy option includes detailing the incentive fee that is to be remitted by the at least one utility provider to the OEM, wherein the incentive fee is based on an average variance of the cost to produce energy between the low energy production cost timeframe and the high energy production cost timeframe.

* * * * *